United States Patent [19]

Das

[11] 4,304,703

[45] Dec. 8, 1981

[54] CATIONIC POLYMER DISPERSIONS AND THEIR METHOD OF PREPARATION

[75] Inventor: Suryya K. Das, Pittsburgh, Pa.

[73] Assignee: PPG Industries, Inc., Pittsburgh, Pa.

[21] Appl. No.: 162,223

[22] Filed: Jun. 23, 1980

[51] Int. Cl.$^3$ .................. C08F 212/08; C08F 2/20; C08F 220/34

[52] U.S. Cl. .................. 260/29.6 WB; 260/29.2 TN; 260/29.3; 260/29.6 NR; 260/29.6 RW; 260/29.6 H; 260/29.6 TA; 260/29.6 PM; 260/29.6 RB; 260/29.6 HN; 525/260; 525/261; 525/279; 525/283; 525/288; 525/293; 526/224; 526/312; 260/29.2 UA

[58] Field of Search .............. 260/29.4 UA, 29.6 TA, 260/29.6 NR, 29.6 H, 29.6 RB, 29.6 RW, 29.6 WB, 29.6 HN, 29.6 PM; 525/293, 260, 261, 279, 288, 261, 279, 293, 260, 288

[56] References Cited

U.S. PATENT DOCUMENTS

| | | | |
|---|---|---|---|
| 3,993,716 | 11/1976 | Klein et al. | 260/29.6 RB |
| 4,033,917 | 7/1977 | Sekmakas et al. | 260/29.4 UA |
| 4,055,527 | 10/1977 | Jozwiak et al. | 260/22 CB |
| 4,064,087 | 12/1977 | Das | 260/29.4 RB |
| 4,075,135 | 2/1978 | Jozwiak et al. | 260/29.7 UP |
| 4,085,161 | 4/1978 | Sekmakas et al. | 260/29.6 HN |
| 4,097,438 | 6/1978 | Cristenson et al. | 260/29.6 HN |
| 4,115,227 | 9/1978 | Hazan | 204/181 C |
| 4,137,282 | 1/1979 | Otsuki et al. | 525/285 |
| 4,151,143 | 4/1979 | Blank et al. | 260/29.6 WB |
| 4,195,147 | 3/1980 | Sekmakas et al. | 260/29.6 HN |
| 4,198,495 | 4/1980 | Sekmakas et al. | 260/29.6 HN |

OTHER PUBLICATIONS

Derwent Abst. 42142x/23 BASF AG (DT2454397), "Cationic Aqueous Copolymer Dispersions . . . ", May 26, 1976.

Derwent Abst. 73499a/41 Shinto Paint KK (J54101-028), Sep. 4, 1978, "Powder Electrodeposition Paint Comp. . . . ".

Derwent Abst. 54729b/30 Metallgesellschaft AB, (DT2801-523), (Jul. 19, 1979), "Aqueous Coating Comp. . . . ".

*Primary Examiner*—Paul Lieberman
*Assistant Examiner*—Herbert J. Lilling
*Attorney, Agent, or Firm*—William J. Uhl

[57] ABSTRACT

Polymeric products containing cationic salt groups, their method of polymerization and their use in coating applications are disclosed. The dispersions are prepared by dispersing in water an at least partially neutralized amine group-containing polymer followed by adding a polymerizable ethylenically unsaturated monomer composition to the dispersion and subjecting the dispersion to addition polymerization conditions. The resultant dispersions are useful in coating applications.

13 Claims, No Drawings

CATIONIC POLYMER DISPERSIONS AND THEIR METHOD OF PREPARATION

CROSS REFERENCE TO RELATED APPLICATIONS

Reference is made to copending applications Ser. Nos. 162,225 and 162,224, filed even date herewith. Application Ser. No. 162,225 describes polymeric products which are prepared by polymerizing in aqueous medium under addition polymerization conditions a dispersed phase of an ethylenically unsaturated polymerizable monomer or mixture of ethylenically unsaturated polymerizable monomers in the presence of an at least partially neutralized polyepoxide-primary and/or secondary amine adduct which contains unsaturation.

Application Ser. No. 162,224 describes polymeric products which are prepared in aqueous medium by polymerizing under addition polymerization conditions a dispersed phase of a polymerizable ethylenically unsaturated monomer or mixture of monomers in the presence of a quaternary ammonium base group-containing polymer which is formed from reacting a polyepoxide with an unsaturated tertiary amine in the presence of a proton source.

BACKGROUND OF THE INVENTION

1. Field of the Invention

The present invention relates to polymeric products and to aqueous dispersions of polymeric products. More particularly, this invention relates to polymeric products which contain cationic salt groups and to the preparation of these polymeric products in aqueous medium by addition polymerization techniques.

2. Brief Description of the Prior Art

Aqueous dispersions of acrylic polymers are known in the prior art for use in water-based coating applications. One method of preparing these polymers involves polymerizing acrylic monomers under free radical polymerization techniques in aqueous medium in the presence of surfactant. The surfactants are needed to stabilize the dispersion and are relatively low molecular weight ionic or non-ionic materials which contain both hydrophilic and hydrophobic groups. Surfactants present a problem in subsequent coating applications in that they remain in the film where they can adversely affect the adhesion and the humidity resistance of the film.

Although acrylic polymers can be prepared without surfactant and dispersed in water, for example, by preparing acrylic polymers containing carboxylic acid groups in organic solvent followed by neutralizing the acrylic polymer with base and dispersing the base-neutralized polymer in water, these particular polymers are of low molecular weight and do not have the physical and chemical properties of acrylic polymers prepared directly in aqueous medium in the presence of surfactant.

SUMMARY OF THE INVENTION

In accordance with the present invention, cationic polymeric products, aqueous dispersions thereof and their method of preparation are provided. The polymeric products are prepared by polymerizing under addition polymerization conditions in aqueous medium:
(A) a dispersed phase of a polymerizable ethylenically unsaturated monomer composition in the presence of
(B) an at least partially phosphoric acid neutralized amine group-containing polymeric dispersant which is formed by polymerizing a mixture of vinyl monomers, a portion of which contains amine functionality,
(C) a free radical polymerization initiator and a chain transfer agent which are soluble in the polymerizable ethylenically unsaturated monomer composition (A).

The process for preparing the aqueous dispersion of the polymeric products comprises:
(A) dispersing in aqueous medium in the presence of an at least partially phosphoric acid neutralized amine group-containing polymer dispersant which is formed from polymerizing a mixture of vinyl monomers, a portion of which contains amine functionality, a polymerizable ethylenically unsaturated monomer composition, a free radical initiator and a chain transfer agent which are soluble in the polymerizable ethylenically unsaturated monomer composition, and
(B) subjecting the dispersion to addition polymerization conditions to form the polymeric product dispersed in aqueous medium.

OTHER PATENTS

U.S. Pat. No. 4,151,143 to Blank discloses a two-stage polymerization process for the preparation of anionic acrylic polymer emulsions. The first stage involves the preparation of an acrylic polymer with COOH groups. The polymer is neutralized with a base and dispersed in water. The second stage polymerization involves polymerizing a mixture of vinyl monomers with a previously prepared dispersion.

U.S. Pat. No. 4,064,087 to Das is similar to U.S. Pat. No. 4,151,143 mentioned above with the exception that the COOH-containing polymer also contains pendent double bonds.

U.S. Pat. No. 4,055,527 to Jozwiak and Das discloses polymerization of dienes and mixtures of dienes and vinyl monomers in aqueous dispersions in the presence of partially neutralized maleinized oils.

The present invention differs from the prior art in that it involves polymerization of a polymerizable ethylenically unsaturated monomer composition in aqueous medium in the presence of a cationic polymer. In the prior art, polymerization is conducted in the presence of an anionic polymer.

U.S. Pat. No. 4,033,917 discloses the reaction of polyepoxides with fatty alcohols or fatty amines to form epoxy-free unsaturated products. These products are then further reacted with copolymerizable ethylenically unsaturated monomers, a portion of which contains amine functionality, for example, a mixture of styrene and dimethylaminopropyl methacrylate. The resultant reaction product is treated with acid and dispersed in water to form aqueous cationic polymer dispersions.

U.S. Pat. No. 4,085,161 is similar to U.S. Pat. No. 4,033,917 mentioned above with the exception that the ethylenically unsaturated blocked isocyanate, for example, toluene diisocyanate capped with hydroxyethyl acrylate and an unsaturated alcohol is included with the ethylenically unsaturated monomer component.

In the present invention, the ethylenically unsaturated monomer component is polymerized in aqueous medium in the presence of a cationic polymer. In the two patents mentioned immediately above, an ethylenically unsaturated monomer component is polymerized with an unneutralized polymer in organic solvent and after polymerization, neutralization and dispersion in water takes place.

DETAILED DESCRIPTION

The polymeric products of the present invention are prepared in aqueous medium by polymerizing under addition polymerization conditions a dispersed phase of a polymerizable ethylenically unsaturated monomer composition in the presence of an at least partially neutralized amine group-containing polymeric dispersant. The polymeric products can be prepared of high molecular weight yet be ungelled and dispersed in aqueous medium in a stable manner.

Examples of polymerizable ethylenically unsaturated monomer compositions are those containing $CH_2=CH-$ moieties such as vinyl monomers, diene monomers and mixtures thereof.

Examples of vinyl monomers which may be used are monoolefinic and diolefinic hydrocarbons such as $C_1-C_{18}$ alkyl acrylates and methacrylates. Examples include methyl methacrylate, butyl methacrylate, hexyl methacrylate, octyl methacrylate, isodecyl methacrylate, stearyl methacrylate, methyl acrylate, ethyl acrylate, butyl acrylate, hexyl acrylate, 2-ethylhexyl acrylate, octyl acrylate, decyl acrylate and dodecyl acrylate. Besides the alkyl esters of acrylic and methacrylic acid mentioned above, substituted alkyl esters, for example, hydroxyalkyl esters such as hydroxyethyl and hydroxypropyl acrylate and methacrylate can also be used.

Examples of other vinyl monomers are esters of organic acids such as vinyl acetate and isopropenyl acetate; allyl compounds such as allyl chloride and allyl cyanide; amides of acrylic acid and methacrylic acid such as acrylamide and methacrylamide and their N-alkoxymethyl derivatives thereof such as N-ethoxy and N-butoxy acrylamide and methacrylamide. Also, vinyl aromatic compounds such as styrene, alpha-methyl styrene, alpha-chloro styrene and vinyl toluene may be used, as well as organic nitriles such as acrylonitrile and methacrylonitrile.

Examples of dienes include 1,3-butadiene, isoprene and most of the di-unsaturated members of the alkylidene series including both the unsubstituted and substituted conjugated diolefins. The substituted diolefins may be those containing lower alkyl groups or halogen groups directly bonded to the alkylidene chain. Representative examples of these diolefins include chloroprene and 2,3-dimethylbutadiene.

Also, mixtures of dienes as well as mixtures of dienes and vinyl monomers can be used.

Examples of the amine group-containing polymers which are used in the practice of the invention are vinyl polymers prepared by addition polymerization techniques.

Among the amino group-containing polymers which can be prepared by addition polymerization techniques are those which are obtained by polymerizing neat or in the presence of organic solvents one or more copolymerizable ethylenically unsaturated monomers, at least a portion of which contains amino functionality. Typical of the amino group-containing vinyl polymers are those which contain in a polymerized form units of:

(A) 5 to 50 percent and preferably 10 to 40 percent by weight of at least one copolymerizable ethylenically unsaturated basic amino compound containing up to 26 carbon atoms, (B) 0 to 75 percent and preferably 10 to 50 percent by weight of at least one alkyl ester of acrylic or methacrylic acid having from 1 to 18 carbon atoms in the alkyl radical, (C) from about 20 to 95 percent, preferably from 40 to 80 percent of a copolymerizable ethylenically unsaturated monomer different from (A) and (B) above.

Suitable ethylenically unsaturated basic amino compounds are those which contain in addition to the amine group one ethylenically unsaturated copolymerizable group and up to 26 carbon atoms, preferably from about 7 to 11 carbon atoms. Representative examples of compounds of this type are compounds having the following structural formula:

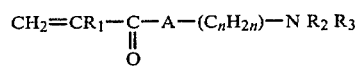

wherein $R_1$ is hydrogen or methyl, $R_2$ and $R_3$ are the same or different and are members of the class consisting of hydrogen and alkyl having 1 to 6 carbon atoms and preferably 1 to 4 carbon atoms, n is one of the integers 1 to 6, and A is oxygen or $NR_4$ where $R_4$ is hydrogen or alkyl having 1 to 4 carbon atoms.

Examples of suitable ethylenically unsaturated basic amino compounds are aminoalkyl esters of acrylic and/or methacrylic acid having 1 to 6 carbon atoms in the alkyl radical such as the aminomethyl, aminoethyl, aminopropyl, aminobutyl and aminohexyl esters. Examples of other aminoalkyl esters having 1 to 6 carbon atoms in the alkyl radical are those whose amino group is substituted by two identical or different alkyl groups with 1 to 4 carbon atoms such as (N,N-dimethylamino)-ethyl ester, (N-methyl-N-butylamino)-ethyl ester and (N,N-dimethylamino)-hexyl ester.

Examples of other suitable ethylenically unsaturated basic amino compounds are N-aminoalkyl acrylamides or methacrylamides. Specific examples of such compounds are aminomethylacrylamide, 1-aminoethyl-2-acrylamide, 1-aminopropyl-2-methacrylamide, N-1-(N'-butylamino)-propyl-(3)-acrylamide and 1-aminohexyl-(6)-acrylamide and 1-(N',N'-dimethylamino)-ethyl-(2)-methacrylamide, 1-(N',N'-dimethylamino)-propyl-(3)-acrylamide and 1-(N,N'-dimethylamino)-hexyl-(6)-methacrylamide.

Examples of other unsaturated basic amino compounds are monocyclic or bicyclic compounds having a 5-membered or 6-membered heterocyclic ring, such as those containing a vinyl group and at least one basic nitrogen atom. The basic nitrogen can also bear the vinyl group. Suitable monocyclic or bicyclic compounds are those which contain no hetero atoms other than nitrogen and for the rest consists of hydrocarbon radicals having not more than 20 carbon atoms. Specific examples are N-vinyl pyrazole, N-vinyl imidazole, N-vinyl imidazoline, N-vinyl piperidine and N-vinyl indole.

Examples of alkyl esters of acrylic or methacrylic acid containing from 1 to 18 carbon atoms in the alkyl radical are methyl methacrylate, butyl methacrylate, hexyl methacrylate, octyl methacrylate, isodecyl methacrylate, stearyl methacrylate, methyl acrylate, ethyl acrylate, butyl acrylate, hexyl acrylate, 2-ethylhexyl acrylate, octyl acrylate, decyl acrylate and dodecyl acrylate. Besides the alkyl esters of alpha, beta-ethylenically unsaturated carboxylic acids mentioned above, substituted alkyl esters, for example, hydroxyalkyl esters such as hydroxyethyl and hydroxypropyl acrylate and methacrylate can also be used.

Examples of other alpha, beta-ethylenically unsaturated monomers copolymerizable with but different from those mentioned above are alpha, beta-ethylenically unsaturated amides such as acrylamide, methacrylamide and the N-alkoxymethyl derivatives thereof such as N-isopropoxy and N-butoxy acrylamide and methacrylamide; vinyl aromatic compounds such as styrene, alpha-methyl styrene, alpha-chloro styrene and vinyl toluene; organic nitriles such as acrylonitrile and methacrylonitrile, allyl monomers such as allyl cyanide and monomeric dienes such as 1,3-butadiene and 2-methyl-1,3-butadiene.

The amino group-containing acrylic polymers can be prepared by conventional free radical initiated solution polymerization techniques in which the polymerizable monomers are dissolved in a solvent or mixture of solvents and polymerized in the presence of a free radical initiator until conversion is complete. Examples of free radical initiators are those which are soluble in the mixture of monomers such as azobisisobutyronitrile, azobis-(alpha, gamma-dimethylvaleronitrile), tertiary-butyl perbenzoate, tertiary-butyl peracetate, benzoyl peroxide and ditertiary-butyl peroxide.

Optionally, a chain transfer agent which is soluble in the mixture of monomers such as alkyl mercaptans, for example, tertiary-dodecyl mercaptan; ketones such as methyl ethyl ketone, chlorohydrocarbons such as chloroform can be used. A chain transfer agent provides control over the molecular weight to give products having the required viscosity for various coating applications. Tertiary-dodecyl mercaptan is preferred because it results in high conversion of monomer to polymeric product.

To prepare the amine group-containing acrylic polymer, the solvent is first heated to reflux and the mixture of polymerizable monomers containing a free radical initiator is added slowly to the refluxing solvent. The reaction mixture is held at polymerizing temperatures so as to reduce the free monomer content to below 1.0 usually below 0.5 percent.

Besides the amine group-containing acrylic polymers mentioned above, other amine group-containing acrylic polymers can be used. Examples include epoxy group-containing acrylic polymers reacted with amines such as described in U.S. Pat. No. 3,998,281, note particularly column 2, line 42 to column 4, line 2, the portions of which are hereby incorporated by reference, and carboxylic acid-containing acrylic polymers reacted with imines such as described in U.S. Pat. No. 3,953,391 to Dowbenko et al, note particularly column 1, line 65 to column 4, line 7, the portions of which are hereby incorporated by reference.

Preferably the amine group-containing acrylic polymer prepared as described above will have a weight average molecular weight of about 3000 to 100,000 and preferably 10,000 to 50,000 as determined by gel permeation chromatography using a polystyrene standard.

In measuring the weight average molecular weight using polystyrene as the standard, a Waters Associates Gel Permeation Chromatograph Model 201 was used. Four $\mu$-Styragel columns were used. Each column has the dimensions of 30 centimeters long and 7.8 millimeters inside diameter. A differential refractometer was used as the detector, and the columns were arranged according to their pore size on the order of $10^4$-$10^3$-500-100 Angstroms with the $10^4$ Angstrom column being the first one. Tetrahydrofuran was used as a solvent with a flow rate of 2.0 milliliters/minute. The quality of the columns is checked by their "theoretical plate number" determined from ortho-dichlorobenzene and those columns with theoretical plate numbers greater than 3000/30 cm. were used.

To determine molecular weight by gel permeation chromatography (GPC), the instrument is first calibrated using a polystyrene standard. The polystyrene standards used were purchased from Pressure Chemicals Company, Pittsburgh, Pennsylvania, and Waters Associates. Polystyrene standards have dispersities (dispersity=weight average molecular weight/number average molecular weight) ranging from 1.05 to 1.10. The weight average molecular weights of the polystyrene standards used were 110,000; 34,500; 20,000; 9,000; 4,000; 2,900; 1,000. To obtain a calibration curve, a set of 1.0 percent (10 milligram polystyrene/1.0 ml. tetrahydrofuran) polystyrene solutions in tetrahydrofuran were prepared and a 0.2 ml. sample size was injected into the columns and a GPC chromatogram was obtained. The elution volume of each peak corresponding to a given molecular weight of the polystyrene standard was measured and the data was plotted on a semi-logarithmic paper (logarithm scale in the ordinate and a linear scale in the abscissa). A linear least squares plot of $\log_{10}$ (molecular weight) versus elution volume in milliliters is used as a calibration curve. The sample whose molecular weight averages are to be determined was prepared as a 1.0 percent tetrahydrofuran solution. After filtration to remove gel particles (if present), through a 0.5 micron MIL- LIPORE filter available from Millipore Corporation, Catalog No. FHLPO1300, a 0.2 ml. sample size was injected into the columns and a GPC chromatogram obtained under the same experimental conditions as the calibration. The chromatogram is divided into vertical segments of equal elution volume approximately 1 milliliter and the height ($H_i$) of each segment and the corresponding molecular weight ($M_i$) obtained from the calibration curve are used to calculate the weight average molecular weight ($M_w$) according to the following equation:

$$M_w = (\Sigma H_i M_i)/(\Sigma H_i)$$

The amine group-containing polymer is at least partially neutralized, for example, by treating with an acid to form a water-dispersible amine salt thereof. Examples of suitable acids are inorganic acids such as phosphoric acid which is preferred because of the anti-corrosive effects of the resultant polymeric amine phosphates towards ferrous metal substrates. Besides acids, salts such as dimethylhydroxyethylammonium dihydrogenphosphate and ammonium dihydrogenphosphate can be used. The amine group-containing polymer is at least partially neutralized, usually to the extent of at least 30 and more usually to the extent of at least 50 percent of the total theoretical neutralization equivalent.

After the amine group-containing polymer has been at least partially neutralized, it is dispersed in aqueous medium. The step of dispersion is accomplished by combining the neutralized or partially neutralized polymer with the aqueous medium. Neutralization and dispersion can be accomplished in one step by combining the amine group-containing polymer and the aqueous medium which cotnains the neutralizing agent. The polymer (or its salt) can be added to the aqueous medium or the aqueous medium added to the polymer (or its salt). The pH of the dispersion is preferably within the range of 5 to about 9.

Besides the amine salt, the quaternary ammonium salt can also be prepared. For example, a tertiary amine group-containing polymer can be quaternized in a conventional manner with a mixture of a monoepoxide such as propylene oxide and acid. Therefore, where the expression "at least partially neutralized amine group-containing polymeric dispersant" is used, both secondary and tertiary amine salts as well as quaternary ammonium salts is intended.

In general, the cationic polymeric products contain from about 0.01 to 3.0, preferably from about 0.2 to 1.0 milliequivalents of cationic base group per gram of resin solids. The cationic base group content will depend on the molecular weight of the polymeric product and the end use intended.

The neutralized or partially neutralized amine group-containing polymer serves as a dispersant for subsequent polymerization of the dispersed phase of the polymerizable monomer composition containing ethylenically unsaturated moieties. The monomer composition is dispersed in the aqueous medium in the presence of the polymer dispersant and subjected to addition polymerization conditions such as by heating in the presence of a free radical initiator until the free monomer content is reduced to below 1 and usually below 0.5 percent. The monomer component is usually added gradually or in incremental fashion if exotherming or foaming is a problem to a preheated aqueous medium which contains the polymer dispersant. The time and temperature of polymerization will depend upon one another, the ingredients selected and the scale of the reaction. Usually polymerization will be between about 5 minutes to 3 hours at about 70° to 95° C.

Polymerization can be conducted in the presence of an oil-soluble free radical polymerization initiator and preferably in the presence of a chain transfer agent such as those mentioned above. Water-soluble free radical polymerization initiators such as peroxydisulfate and hydrogen peroxide are less desirable. Also, polymerization can be conducted in the presence of radiation such as gamma radiation.

Preferred products are generally obtained from using from about 20 to 80, preferably 25 to 75 percent by weight of the polymer dispersant and from about 80 to 20, preferably 75 to 25 percent by weight of the dispersed phase of the alpha, beta-ethylenically unsaturated monomer component; the percentages by weight being based on total weight of dispersant and dispersed phase.

For polymerization, the aqueous medium preferably should be present in an amount of about 40 to 90, more preferably 50 to 85 percent by weight based on total weight of dispersant and aqueous medium.

Besides water, the aqueous medium can contain organic cosolvents. The organic cosolvents are preferably at least partially soluble in water. Examples of such solvents include oxygenated organic solvents such as the monoalkyl ethers of ethylene glycol and diethylene glycol which contain from about 1 to 4 carbon atoms in the alkyl group such as the monoethyl and monobutyl ethers of ethylene glycol and diethylene glycol. Examples of other water-soluble solvents include alcohols such as ethanol, isopropanol, n-butanol and diacetone alcohol.

Preferably, the organic cosolvent is present in amounts of less than about 10 percent and more preferably less than 5 percent based on total weight of the aqueous medium.

For coating applications, the resin solids content of the aqueous dispersion is prepared in accordance with the present invention and will vary somewhat depending upon the particular resinous materials employed. Resin solids contents of about 5 to 80, preferably about 10 to 60 percent by weight in the aqueous medium are typical.

The polymeric products can be prepared in accordance with the process of the present invention to form stable, aqueous dispersions. By stable is meant the dispersions will not gel, flocculate nor precipitate at a temperature of 25° C. for at least 60 days. If some precipitation does occur, the precipitate can easily be redispersed by low shear agitation. The aqueous dispersions are usually 2-phase translucent aqueous-polymer systems in which the aqueous phase forms a continuous phase. The polymeric products are dispersible in the absence of added dispersing agent, i.e., low molecular weight surfactant. In other words, the dispersion needs no externally added dispersing agent to maintain its stability, although of course dispersing agents may be added if desired.

Although the polymeric products of the present invention can be made self-curing, a curing agent can be used if desired. The polymeric products of the present invention can be prepared with active hydrogens such as hydroxyl, primary and secondary amino which make them reactive at elevated temperatures with a curing agent. The curing agent which is used should be one which is stable in the aqueous dispersion of the polymeric product at room temperature but reactive with the active hydrogens at elevated temperature, that is, from about 90° to 260° C. to form a crosslinked product. Examples of suitable curing agents are capped or blocked isocyanates, aminoplast resins and phenolic resins such as phenol-formaldehyde condensates including allyl ether derivatives thereof.

Examples of suitable capped isocyanates are those described in U.S. Pat. No. 4,104,147, column 7, line 36, continuing to column 8, line 37, the portions of which are hereby incorporated by reference. Sufficient capped isocyanate is present such that the equivalent ratio of latent isocyanate groups to active hydrogens of the polymeric product is at least 0.1:1, preferably about 0.3 to 1:1.

Examples of aminoplast are those described in U.S. Pat. No. 3,937,679 to Bosso and Wismer in column 16, line 3, continuing to column 17, line 47, the portions of which are hereby incorporated by reference. Also disclosed in the aforementioned portions of the '679 patent, the aminoplast can be used in combination with the methylol phenol ethers. Aminoplast curing agents usually constitute from about 1 to 60, preferably 5 to 40 percent by weight of the resinous composition based on total weight of aminoplast and the polymeric product.

The aqueous dispersions of the polymeric products of the present invention are useful in coating applications. The aqueous dispersions can be applied to a substrate to form films and the water evaporated either at room temperature (20°-23° C.) or at elevated temperature, for example, 25°-250° C. The cured coatings will generally have a thickness of about 0.1 to 10, usually 0.5 to 5 mils depending upon the solids content of the coating composition and on the method of applying the coating.

The coating compositions can be used to form clear coatings or optionally can be pigmented. The pigments may be any of the conventional types comprising, for example, iron oxides, lead oxides, strontium chromate, carbon black, coal dust, titanium dioxide, talc, barium sulfate, as well as color pigments such as cadmium yellow, cadmium red, chromium yellow, phthalocyanine blue and the metallic pigments such as aluminum flake.

In addition to the above ingredients, various additives such as fillers, plasticizers, waxes, anti-oxidants, ultraviolet light absorbers, defoamers, fungicides, flow control agents, and other formulating additives can optionally be employed if desired. These materials will generally constitute up to 20 percent by weight of the coating composition based on total solids.

The coating compositions of the invention can be applied to a variety of substrates such as wood, metal, glass, concrete, cloth, plastics, foams, and the like by a variety of application techniques such as air spraying, airless spraying, electrostatic spraying, electrodeposition, dipping, brushing, rolling, roller coating and the like.

Illustrating the invention are the following examples which, however, are not to be considered as limiting the invention to their details. All quantities are on a weight basis unless otherwise indicated.

EXAMPLE I

Preparation of Polymeric Dispersant

A cationic acrylic polymer dispersant was prepared as follows:

| Feed A | |
|---|---|
| Ingredients | Parts by Weight (in grams) |
| styrene | 1354.2 |
| dimethylaminoethyl methacrylate | 1354.2 |
| hydroxyethyl acrylate | 677.3 |
| t-dodecyl mercaptan | 34.0 |
| VAZO 64[1] | 40.0 |

[1]Azobisisobutyronitrile commerically available from E.I. duPont de Nemours and Company.

| Feed B | |
|---|---|
| Ingredients | Parts by Weight |
| 2-butoxyethanol | 54.6 |
| tertiary-butyl perbenzoate | 7.2 |

An initial charge comprising 1261.4 grams of 2-butoxyethanol and 36.4 grams of deionized water was heated in a reaction flask under a nitrogen atmosphere to reflux. The source of nitrogen was shut off, and Feed A was added to the reaction vessel over a period of about 3 hours, the temperature being maintained between 120° and 134° C. At the completion of Feed A, Feed B was initiated and added over the period of about 2 hours (the reaction mixture being maintained at a temperature between 134° and 136° C.). At the completion of Feed B, the reaction mixture was held for one hour at 136° C. The reaction mixture had a total solids content of 69.5 percent (theoretical 71.25 percent).

The polymer prepared as described above was treated with phosphoric acid, with lactic acid and with a mixture of lactic acid and phosphoric acid as described below and dispersed in water.

Solubilization with Phosphoric Acid and Dispersion in Water

The polymer, 1490.2 grams, was added to a mixture of 99.0 grams of 85 percent $H_3PO_4$ (100 percent total theoretical neutralization) and 99 grams of water. After the completion of the addition, the mixture was further thinned with 1311.6 grams of water. The mixture had a total solids content of 34.7 percent, a pH of 6.7 and a Brookfield viscosity of 7500 centipoises measured with a No. 6 spindle at 20 rpm's at room temperature.

Solubilization with Lactic Acid

The polymer (1500 grams) was added to 273.5 grams of 85 percent lactic acid (100 percent of the total theoretical neutralization). The mixture was then thinned with 1226.5 parts by weight of deionized water. The dispersion had a total solids content of 35 percent, a pH of 6.2 and a Brookfield viscosity of 2200 centipoises measured with a No. 5 spindle at 20 rpm's at room temperature.

Solubilization with Phosphoric Acid/Lactic Acid Mixture

The polymer (1000 grams) was added to a mixture of 93.3 grams of lactic acid (50 percent total theoretical neutralization) and 34.3 grams of phosphoric acid (50 percent total theoretical neutralization). The mixture was then thinned with 1172.4 parts of deionized water. The dispersion had a total solids content of 35 percent, a pH of 6.4 and a Brookfield viscosity of 3720 centipoises measured with a No. 6 spindle at 20 rpm's at room temperature.

Preparation of Aqueous Dispersion of Polymeric Product

Butyl acrylate, styrene and hydroxyethyl acrylate were dispersed and polymerized in the presence of the above-described polymeric dispersants as follows:

| Reactor Charge | |
|---|---|
| Ingredients | Parts by Weight (in grams) |
| phosphoric acid solubilized aqueous polymeric dispersant prepared as described above | 324.3 (113 parts solids) |
| deionized water | 334.0 |

| Feed C | |
|---|---|
| Ingredients | Parts by Weight (in grams) |
| butyl acrylate | 55.6 |
| styrene | 52.4 |
| hydroxyethyl acrylate | 12.0 |
| VAZO 64 | 1.8 |

The reactor change was heated in a reaction kettle to 60° C. followed by the rapid addition of Feed C. The reaction mixture started to exotherm at about 89° C. and it was held for 3 hours at reflux. The reaction mixture was then cooled and filtered. The polymeric product was ungelled and well dispersed. The dispersion had a pH of 6.5, a solids content of 28.9 percent (theoretical 30 percent) and a Brookfield viscosity of 920 centipoises measured with a No. 2 spindle at 20 rpm's at room temperature.

When butyl acrylate, styrene and hydroxyethyl acrylate were dispersed and polymerized in the presence of the lactic acid solubilized polymeric dispersant in the manner described above, a dispersion of a polymeric product having a total solids content of 30 percent, a pH of 5.25 and a Brookfield viscosity of 194 centipoises measured with a No. 1 spindle at 20 rpm's at room temperature was obtained.

Butyl acrylate and hydroxyethyl acrylate were dispersed and polymerized in the presence of the mixed phosphoric acid/lactic acid polymeric dispersant prepared according to the following charge:

| Reactor Charge | |
|---|---|
| Ingredients | Parts by Weight (in grams) |
| mixed phosphoric acid/lactic acid polymeric dispersant prepared as described above | 324.3 |
| deionized water | 334 |
| Feed D | |
| Ingredients | Parts by Weight |
| butyl acrylate | 55.6 |
| hydroxyethyl acrylate | 64.4 |
| VAZO 64 | 1.8 |

The procedure for polymerizing was as described above. An ungelled, stable, aqueous dispersion which had a pH of 6.0, 30.3 percent resin solids and a Brookfield viscosity of 2500 centipoises measured with a No. 6 spindle at 20 rpm's at room temperature was obtained.

Clear films of the phosphoric acid-solubilized and the lactic acid-solubilized dispersions prepared as described above were drawn down with a 0.3 draw bar over a glass substrate. The films were baked at 350° F. (177° C.) and at 400° F. (204° C.) for 30 minutes to yield glossy, cured coatings. The cured coatings were tested for acetone resistance which is the measure of the resistance of the baked surface coating to rubbing by the number of double rubs with an acetone-saturated cloth required to soften the coating. If the rubbing did not soften the film, the test was terminated after 100 double rubs. The results are presented in the table below.

The phosphoric acid-solubilized and the lactic acid-solubilized dispersions prepared as described above were combined with 10 percent by weight (based on total resin solids) of an alkylated melamine-formaldehyde condensate sold commercially by American Cyanamid Company as CYMEL 1141. Clear films of the dispersions were drawn down with a 0.3 draw bar over a glass substrate and the films baked at 177° C. and at 204° C. for 30 minutes. The cured coatings were glossy and were tested for acetone resistance as described above. The results are presented in the table below.

TABLE I

| Acetone Resistance of Dispersions of Example I | | | | |
|---|---|---|---|---|
| | Without CYMEL 1141 | | With CYMEL 1141 | |
| | 1177° C. | 204° C. | 117° C. | 204° C. |
| phosphoric acid-solubilized dispersion | 100 | 100 | 100 | 100 |
| lactic acid-solubilized dispersion | 60 | 100 | 75 | 100 |

EXAMPLE II

A cationic acrylic polymer dispersant was prepared as follows:

| Feed A | |
|---|---|
| Ingredients | Parts by Weight (in grams) |
| styrene | 386.9 |
| dimethylaminoethyl methacrylate | 386.9 |
| hydroxyethyl acrylate | 193.5 |
| tertiary-dodecyl mercaptan | 9.7 |
| VAZO 64 | 11.3 |
| Feed B | |
| Ingredients | Parts by Weight (in grams) |
| 2-butoxyethanol | 15.6 |
| tertiary-butyl perbenzoate | 2.0 |

An initial charge of 360.4 parts of 2-butoxyethanol and 18.2 parts by weight of deionized water was heated in a reaction flask under a nitrogen atmosphere to reflux at 113° C. The nitrogen flow was stopped and Feed A was started and continued over a period of about 3 hours with the temperature being maintained at reflux. At the completion of Feed A, Feed B was started and continued for 2 hours at reflux. The reaction mixture was held for one hour at reflux (125° C.) to complete the reaction.

The polymer prepared as described above was treated with phosphoric acid as described below and dispersed in water.

| Solubilization With Phosphoric Acid And Dispersion In Water | |
|---|---|
| Ingredients | Parts by Weight (in grams) |
| polymer prepared as described above | 61.1 |
| concentrated phosphoric acid | 10.7 |
| deionized water | 152.5 |

The solubilized polymer had a pH of 7.0 and a resin solids content of about 35 percent.

Preparation of Aqueous Dispersions of Polymeric Product

Styrene and hydroxyethyl acrylate were dispersed and polymerized in the presence of the above-described polymeric dispersants as follows:

| Reactor Charge | |
|---|---|
| Ingredients | Parts by Weight (in grams) |
| phosphoric acid solubilized aqueous polymeric dispersant prepared as described above (35% resin solids) | 324.3 |
| Feed C | |
| Ingredients | Parts by Weight (in grams) |
| styrene | 55.6 |
| hydroxyethyl acrylate | 64.4 |
| VAZO 64 | 1.8 |
| Feed D | |
| Ingredients | Parts by Weight (in grams) |
| deionized water | 175.9 |

The reactor charge was heated with agitation and under a nitrogen atmosphere to 60° C. Feed C was then initiated, temperature raised to 87° C. and held for 3 hours. At a temperature of 88° C., Feed D was added over the period of about one hour and the reaction mixture held for an additional one hour at 88° C. The reaction mixture had a pH of 6.7, a total solids content of 31.1 percent (theoretical 30 percent) and a viscosity of 45,000 centipoises measured with a No. 7 spindle at 20 rpm's at room temperature.

I claim:

The coating compositions can be used to form clear coatings or optionally can be pigmented. The pigments may be any of the conventional types comprising, for example, iron oxides, lead oxides, strontium chromate, carbon black, coal dust, titanium dioxide, talc, barium sulfate, as well as color pigments such as cadmium yellow, cadmium red, chromium yellow, phthalocyanine blue and the metallic pigments such as aluminum flake.

In addition to the above ingredients, various additives such as fillers, plasticizers, waxes, anti-oxidants, ultraviolet light absorbers, defoamers, fungicides, flow control agents, and other formulating additives can optionally be employed if desired. These materials will generally constitute up to 20 percent by weight of the coating composition based on total solids.

The coating compositions of the invention can be applied to a variety of substrates such as wood, metal, glass, concrete, cloth, plastics, foams, and the like by a variety of application techniques such as air spraying, airless spraying, electrostatic spraying, electrodeposition, dipping, brushing, rolling, roller coating and the like.

Illustrating the invention are the following examples which, however, are not to be considered as limiting the invention to their details. All quantities are on a weight basis unless otherwise indicated.

EXAMPLE I

Preparation of Polymeric Dispersant

A cationic acrylic polymer dispersant was prepared as follows:

| Feed A | |
|---|---|
| Ingredients | Parts by Weight (in grams) |
| styrene | 1354.2 |
| dimethylaminoethyl methacrylate | 1354.2 |
| hydroxyethyl acrylate | 677.3 |
| t-dodecyl mercaptan | 34.0 |
| VAZO 64[1] | 40.0 |

[1]Azobisisobutyronitrile commerically available from E.I. duPont de Nemours and Company.

| Feed B | |
|---|---|
| Ingredients | Parts by Weight |
| 2-butoxyethanol | 54.6 |
| tertiary-butyl perbenzoate | 7.2 |

An initial charge comprising 1261.4 grams of 2-butoxyethanol and 36.4 grams of deionized water was heated in a reaction flask under a nitrogen atmosphere to reflux. The source of nitrogen was shut off, and Feed A was added to the reaction vessel over a period of about 3 hours, the temperature being maintained between 120° and 134° C. At the completion of Feed A, Feed B was initiated and added over the period of about 2 hours (the reaction mixture being maintained at a temperature between 134° and 136° C.). At the completion of Feed B, the reaction mixture was held for one hour at 136° C. The reaction mixture had a total solids content of 69.5 percent (theoretical 71.25 percent).

The polymer prepared as described above was treated with phosphoric acid, with lactic acid and with a mixture of lactic acid and phosphoric acid as described below and dispersed in water.

Solubilization with Phosphoric Acid and Dispersion in Water

The polymer, 1490.2 grams, was added to a mixture of 99.0 grams of 85 percent $H_3PO_4$ (100 percent total theoretical neutralization) and 99 grams of water. After the completion of the addition, the mixture was further thinned with 1311.6 grams of water. The mixture had a total solids content of 34.7 percent, a pH of 6.7 and a Brookfield viscosity of 7500 centipoises measured with a No. 6 spindle at 20 rpm's at room temperature.

Solubilization with Lactic Acid

The polymer (1500 grams) was added to 273.5 grams of 85 percent lactic acid (100 percent of the total theoretical neutralization). The mixture was then thinned with 1226.5 parts by weight of deionized water. The dispersion had a total solids content of 35 percent, a pH of 6.2 and a Brookfield viscosity of 2200 centipoises measured with a No. 5 spindle at 20 rpm's at room temperature.

Solubilization with Phosphoric Acid/Lactic Acid Mixture

The polymer (1000 grams) was added to a mixture of 93.3 grams of lactic acid (50 percent total theoretical neutralization) and 34.3 grams of phosphoric acid (50 percent total theoretical neutralization). The mixture was then thinned with 1172.4 parts of deionized water. The dispersion had a total solids content of 35 percent, a pH of 6.4 and a Brookfield viscosity of 3720 centipoises measured with a No. 6 spindle at 20 rpm's at room temperature.

Preparation of Aqueous Dispersion of Polymeric Product

Butyl acrylate, styrene and hydroxyethyl acrylate were dispersed and polymerized in the presence of the above-described polymeric dispersants as follows:

| Reactor Charge | |
|---|---|
| Ingredients | Parts by Weight (in grams) |
| phosphoric acid solubilized aqueous polymeric dispersant prepared as described above | 324.3 (113 parts solids) |
| deionized water | 334.0 |

| Feed C | |
|---|---|
| Ingredients | Parts by Weight (in grams) |
| butyl acrylate | 55.6 |
| styrene | 52.4 |
| hydroxyethyl acrylate | 12.0 |
| VAZO 64 | 1.8 |

The reactor change was heated in a reaction kettle to 60° C. followed by the rapid addition of Feed C. The reaction mixture started to exotherm at about 89° C. and it was held for 3 hours at reflux. The reaction mixture was then cooled and filtered. The polymeric product was ungelled and well dispersed. The dispersion had a pH of 6.5, a solids content of 28.9 percent (theoretical 30 percent) and a Brookfield viscosity of 920 centipoises measured with a No. 2 spindle at 20 rpm's at room temperature.

When butyl acrylate, styrene and hydroxyethyl acrylate were dispersed and polymerized in the presence of the lactic acid solubilized polymeric dispersant in the manner described above, a dispersion of a polymeric product having a total solids content of 30 percent, a pH of 5.25 and a Brookfield viscosity of 194 centipoises measured with a No. 1 spindle at 20 rpm's at room temperature was obtained.

Butyl acrylate and hydroxyethyl acrylate were dispersed and polymerized in the presence of the mixed phosphoric acid/lactic acid polymeric dispersant prepared according to the following charge:

| Reactor Charge | |
|---|---|
| Ingredients | Parts by Weight (in grams) |
| mixed phosphoric acid/lactic acid polymeric dispersant prepared as described above | 324.3 |
| deionized water | 334 |
| Feed D | |
| Ingredients | Parts by Weight |
| butyl acrylate | 55.6 |
| hydroxyethyl acrylate | 64.4 |
| VAZO 64 | 1.8 |

The procedure for polymerizing was as described above. An ungelled, stable, aqueous dispersion which had a pH of 6.0, 30.3 percent resin solids and a Brookfield viscosity of 2500 centipoises measured with a No. 6 spindle at 20 rpm's at room temperature was obtained.

Clear films of the phosphoric acid-solubilized and the lactic acid-solubilized dispersions prepared as described above were drawn down with a 0.3 draw bar over a glass substrate. The films were baked at 350° F. (177° C.) and at 400° F. (204° C.) for 30 minutes to yield glossy, cured coatings. The cured coatings were tested for acetone resistance which is the measure of the resistance of the baked surface coating to rubbing by the number of double rubs with an acetone-saturated cloth required to soften the coating. If the rubbing did not soften the film, the test was terminated after 100 double rubs. The results are presented in the table below.

The phosphoric acid-solubilized and the lactic acid-solubilized dispersions prepared as described above were combined with 10 percent by weight (based on total resin solids) of an alkylated melamine-formaldehyde condensate sold commercially by American Cyanamid Company as CYMEL 1141. Clear films of the dispersions were drawn down with a 0.3 draw bar over a glass substrate and the films baked at 177° C. and at 204° C. for 30 minutes. The cured coatings were glossy and were tested for acetone resistance as described above. The results are presented in the table below.

TABLE I

| Acetone Resistance of Dispersions of Example I | | | | |
|---|---|---|---|---|
| | Without CYMEL 1141 | | With CYMEL 1141 | |
| | 1177° C. | 204° C. | 117° C. | 204° C. |
| phosphoric acid-solubilized dispersion | 100 | 100 | 100 | 100 |
| lactic acid-solubilized dispersion | 60 | 100 | 75 | 100 |

EXAMPLE II

A cationic acrylic polymer dispersant was prepared as follows:

| Feed A | |
|---|---|
| Ingredients | Parts by Weight (in grams) |
| styrene | 386.9 |
| dimethylaminoethyl methacrylate | 386.9 |
| hydroxyethyl acrylate | 193.5 |
| tertiary-dodecyl mercaptan | 9.7 |
| VAZO 64 | 11.3 |
| Feed B | |
| Ingredients | Parts by Weight (in grams) |
| 2-butoxyethanol | 15.6 |
| tertiary-butyl perbenzoate | 2.0 |

An initial charge of 360.4 parts of 2-butoxyethanol and 18.2 parts by weight of deionized water was heated in a reaction flask under a nitrogen atmosphere to reflux at 113° C. The nitrogen flow was stopped and Feed A was started and continued over a period of about 3 hours with the temperature being maintained at reflux. At the completion of Feed A, Feed B was started and continued for 2 hours at reflux. The reaction mixture was held for one hour at reflux (125° C.) to complete the reaction.

The polymer prepared as described above was treated with phosphoric acid as described below and dispersed in water.

| Solubilization With Phosphoric Acid And Dispersion In Water | |
|---|---|
| Ingredients | Parts by Weight (in grams) |
| polymer prepared as described above | 61.1 |
| concentrated phosphoric acid | 10.7 |
| deionized water | 152.5 |

The solubilized polymer had a pH of 7.0 and a resin solids content of about 35 percent.

Preparation of Aqueous Dispersions of Polymeric Product

Styrene and hydroxyethyl acrylate were dispersed and polymerized in the presence of the above-described polymeric dispersants as follows:

| Reactor Charge | |
|---|---|
| Ingredients | Parts by Weight (in grams) |
| phosphoric acid solubilized aqueous polymeric dispersant prepared as described above (35% resin solids) | 324.3 |
| Feed C | |
| Ingredients | Parts by Weight (in grams) |
| styrene | 55.6 |
| hydroxyethyl acrylate | 64.4 |
| VAZO 64 | 1.8 |
| Feed D | |
| Ingredients | Parts by Weight (in grams) |
| deionized water | 175.9 |

The reactor charge was heated with agitation and under a nitrogen atmosphere to 60° C. Feed C was then initiated, temperature raised to 87° C. and held for 3 hours. At a temperature of 88° C., Feed D was added over the period of about one hour and the reaction mixture held for an additional one hour at 88° C. The reaction mixture had a pH of 6.7, a total solids content of 31.1 percent (theoretical 30 percent) and a viscosity of 45,000 centipoises measured with a No. 7 spindle at 20 rpm's at room temperature.

I claim:

1. A cationic polymeric product which is prepared by polymerizing under addition polymerization conditions in aqueous medium:
   (A) a polymerizable ethylenically unsaturated monomer composition, in the presence of
   (B) an at least partially phosphoric acid neutralized amine group-containing polymeric dispersant which is formed from polymerizing a mixture of vinyl monomers, a portion of which contains amine functionality,
   (C) a free radical polymerization initiator and a chain transfer agent which are soluble in the polymerizable ethylenically unsaturated monomer composition (A).

2. The product of claim 1 in which the monomer composition (A) includes an alkyl ester of acrylic or methacrylic acid containing from 1 to 18 carbon atoms in the alkyl group.

3. The product of claim 1 in which the monomer composition (A) includes styrene.

4. The product of claim 1 in which the amine group-containing vinyl polymer is formed from polymerizing the following mixture of copolymerizable ethylenically unsaturated monomers:
   (A) 5 to 50 percent of a copolymerizable ethylenically unsaturated basic amino compound containing up to 26 carbon atoms,
   (B) 0 to 75 percent of at least one alkyl ester of acrylic or methacrylic acid having from 1 to 18 carbon atoms in the alkyl radical,
   (C) 20 to 95 percent of a copolymerizable ethylenically unsaturated monomer different from (A) and (B).

5. The product of claim 4 in which the copolymerizable ethylenically unsaturated basic amino compound has the following structural formula:

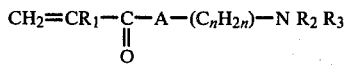

wherein $R_1$ is hydrogen or methyl, $R_2$ and $R_3$ are the same or different and are members of the class consisting of hydrogen and alkyl having 1 to 6 carbon atoms, n is one of the integers 1 to 6, and A is oxygen or $NR_4$ where $R_4$ is hydrogen or alkyl having 1 to 4 carbon atoms.

6. The product of claim 4 in which the copolymerizable monomer component (C) is a vinyl aromatic compound.

7. The product of claim 6 in which the vinyl aromatic compound is styrene.

8. The product of claim 1 in which the free radical polymerization initiator is selected from the class consisting of peroxides, azo compounds and diazo compounds.

9. The product of claim 1 in which the chain transfer agent is tertiary-dodecyl mercaptan.

10. An aqueous dispersion of the polymeric products of claims 1, 2, 3, 4, 5, 6, 7, 8 or 9.

11. A process for preparing a polymeric product, comprising:
    (A) dispersing in aqueous medium in the presence of an at least partially phosphoric acid neutralized amine group-containing polymer dispersant which is formed from polymerizing a mixture of vinyl monomers, a portion of which contains amine functionality, a polymerizable ethylenically unsaturated monomer composition, a free radical initiator and a chain transfer agent which are soluble in the polymerizable ethylenically unsaturated monomer composition, and
    (B) subjecting said dispersion to addition polymerization conditions to form the polymeric product dispersed in aqueous medium.

12. The process of claim 11 in which the free radical polymerization initiator is selected from the class consisting of peroxides, azo compounds and diazo compounds.

13. The process of claim 11 in which the chain transfer agent is tertiary-dodecyl mercaptan.